(12) United States Patent
Durand

(10) Patent No.: US 11,408,648 B2
(45) Date of Patent: Aug. 9, 2022

(54) REFRIGERATION DEVICE AND METHOD

(71) Applicant: L'Air Liquide, Societe Anonyme pour l'Etude et l'Exploitation des Procedes Georges Claude, Paris (FR)

(72) Inventor: Fabien Durand, Voreppes (FR)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 2 days.

(21) Appl. No.: 16/755,147

(22) PCT Filed: Aug. 1, 2018

(86) PCT No.: PCT/FR2018/051974
§ 371 (c)(1),
(2) Date: Apr. 9, 2020

(87) PCT Pub. No.: WO2019/073129
PCT Pub. Date: Apr. 18, 2019

(65) Prior Publication Data
US 2020/0300510 A1    Sep. 24, 2020

(30) Foreign Application Priority Data

Oct. 9, 2017  (FR) ................................ FR 1701041

(51) Int. Cl.
*F25B 1/10* (2006.01)
*F25B 9/14* (2006.01)
(Continued)

(52) U.S. Cl.
CPC ................. *F25B 1/10* (2013.01); *F25B 9/14* (2013.01); *F25B 11/02* (2013.01); *F25B 31/026* (2013.01);
(Continued)

(58) Field of Classification Search
CPC .... F25B 1/10; F25B 9/14; F25B 11/02; F25B 31/026; F25B 49/025; F25B 2309/005; F25B 2309/14; F25B 9/06; F01K 25/10
(Continued)

(56) References Cited

U.S. PATENT DOCUMENTS

2010/0263405 A1* 10/2010 Durand ................. F25J 1/0288
62/6
2016/0164378 A1* 6/2016 Gauthier ............... H02K 7/116
310/54

FOREIGN PATENT DOCUMENTS

JP    2001 041598    2/2001
JP    2006 118773    5/2006
(Continued)

OTHER PUBLICATIONS

International Search Report and Written Report for PCT/FR2018/051974, dated Sep. 25, 2018.
(Continued)

*Primary Examiner* — Steve S Tanenbaum
(74) *Attorney, Agent, or Firm* — Christopher J. Cronin

(57) ABSTRACT

Refrigeration device intended to extract heat from at least one member by heat exchange with a working fluid circulating in the working circuit comprising in series: a fluid compression mechanism a fluid cooling mechanism, preferably isobaric or substantially isobaric, a fluid expansion mechanism, and a fluid heating mechanism, in which device the compression mechanism is of the centrifugal compression type and consists of two compression stages arranged in series in the circuit, the device comprising two respective electric drive motors driving the two compression stages, the expansion mechanism consisting of a turbine coupled to the
(Continued)

motor of one of the compression stages, the turbine of the expansion mechanism being coupled to the drive motor of the first compression stage.

13 Claims, 2 Drawing Sheets

(51) Int. Cl.
    *F25B 11/02*     (2006.01)
    *F25B 31/02*     (2006.01)
    *F25B 49/02*     (2006.01)

(52) U.S. Cl.
    CPC ...... *F25B 49/025* (2013.01); *F25B 2309/005* (2013.01); *F25B 2309/14* (2013.01)

(58) Field of Classification Search
    USPC .......................................................... 62/510
    See application file for complete search history.

(56) References Cited

FOREIGN PATENT DOCUMENTS

| JP | 3928230 | 6/2007 |
|---|---|---|
| WO | WO 2009/066044 | 5/2009 |

OTHER PUBLICATIONS

French Search Report and Written Report for FR 1701041, dated Jun. 27, 2018.

\* cited by examiner

REFRIGERATION DEVICE AND METHOD

CROSS-REFERENCE TO RELATED APPLICATIONS

This application is a § 371 of International PCT Application PCT/FR2018/051974, filed Aug. 1, 2018, which claims § 119(a) foreign priority to French patent application FR 1701041, filed Oct. 9, 2017.

BACKGROUND

Field of the Invention

The invention relates to a device and a method for low-temperature refrigeration.

The invention relates more particularly to a device for low-temperature refrigeration between −100° C. and −273° C. comprising a working circuit containing a working fluid, the device being intended to extract heat from at least one component by heat exchange with the working fluid circulating in the working circuit, the working circuit comprising in series: a mechanism for compression of the fluid, preferably isentropic or substantially isentropic, a mechanism for cooling of the fluid, preferably isobaric or substantially isobaric, a mechanism for expansion of the fluid, preferably isentropic or substantially isentropic, and a mechanism for heating of the fluid, preferably isobaric or substantially isobaric, in which the compression mechanism is of the type with centrifugal compression and consists of two compression stages, a first compression stage and a second compression stage respectively arranged in series in the circuit, the device comprising two respective electric drive motors of the two compression stages, and the expansion mechanism consists of a turbine coupled to the motor of one of the compression stages.

The invention relates in particular to refrigerators with a so-called "Turbo Brayton" cycle or "Turbo Brayton coolers".

The invention relates in particular to cryogenic refrigerators, i.e. reaching temperatures less than or equal to −100° C. or 173K for example notably between −100° C. and −273° C.

Related Art

Document JP3928230B2 describes a refrigerator of the Turbo-Brayton type using a high-speed motor, with a turbine and a compressor located respectively at the two ends of its drive shaft.

To improve the energy efficiency of a refrigerator, one solution consists of using one or more high-efficiency centrifugal compressors. A centrifugal compressor attains high efficiency if its specific speed is equal to or close to the optimum value. The optimum value is determined experimentally by a person skilled in the art by collecting the measurements of efficiency of a large number of centrifugal compressors having different specific speeds. It is typically 0.75 when it is calculated with the system of units defined hereunder.

If this specific speed is above or below the optimum value, the efficiency is lower. The specific speed ws of a centrifugal compressor is defined by the following formula: $ws = w \cdot Q^{0.5}/\Delta hs^{0.75}$ in which w is the rotary speed of the compressor in radians per second, Q is the volume flow rate at compressor inlet in m³/s and $\Delta hs$ is the increase in enthalpy through the compression stage (in J/kg) assuming the compression to be isentropic.

A known device is illustrated in FIG. 1. A single motor 2 drives a compressor 13 and a turbine 8. The inventors found that this type of device does not allow the compressor to be operated at a good specific speed. In fact, the low volume flow rate inherent in this architecture leads to a low specific speed relative to the optimum value.

Another known solution, illustrated in FIG. 2, consists of using a second motor 7 with a centrifugal compressor at one of its ends, and placing this machine upstream of the compressor 13 already present.

Since there is a change in optimum overall enthalpy $\Delta hs$ with respect to the refrigerator, the latter is not modified relative to the prior art. This novel architecture makes it possible to distribute the change in overall enthalpy $\Delta hs$ over the two compression stages 4, 13 and consequently reduce the change in enthalpy $\Delta hs$ of one compression stage and increase the specific speed of the two compression stages 4, 13 and approach or reach the optimum specific speed.

However, the inventors found that, in practice, this improvement only benefits the first compression stage 4. In fact if the first compression stage 4 operates at the optimum specific speed, the second compression stage 13 will operate at a specific speed typically of half the optimum specific speed. This has an effect on the efficiency of this stage (typically ten points lower efficiency) and consequently has a strong influence on the overall efficiency of the refrigerator.

This can be demonstrated in the following example of calculation (in which it is assumed that the mechanical power and the rotary speed of the two motors 2, 7 are identical).

In this example, the mechanical power P2 of the second compression stage 13 is equal to 150% of the mechanical power P1 of the first compression stage 4 owing to the presence of the turbine 8, which typically helps the second motor 2 to raise the power of the motor by 50%. Since the mechanical power of a centrifugal compressor P is equal to the product of the mass flow rate in times the increase in enthalpy $\Delta h$ ($P = \dot{m} \cdot \Delta h$) and the mass flow rate of the two compression stages is identical, then the increase in enthalpy of the second compression stage $\Delta h2$ is equal to 150% of the increase in enthalpy of the first compression stage: $\Delta h2 = 150\% \, \Delta h1$.

$\Delta h$ being the real (measured) increase in enthalpy through the compression stage (in J/kg) (i.e. compression is not necessarily isentropic).

If in addition it is assumed that the efficiencies of the two compression stages are identical, then $\Delta hs2 = 150\% \, \Delta hs1$.

The volume flow rate Q2 of the second compression stage 13 is equal to 56% of the volume flow rate Q1 of the first compression stage because the compression ratio is typically 1.8 at the level of the first compression stage 4: $Q2 = 56\% \, Q1$.

The specific speed ws1 of the first compression stage 4 is equal to $w \cdot Q1^{0.5}/\Delta hs1^{0.75}$.

The specific speed ws2 of the second compression stage 13 is therefore equal to $ws2 = w \cdot Q2^{0.5}/\Delta hs2^{0.75} = w \cdot (56\% \, Q1)^{0.5}/(150\% \, \Delta hs1)^{0.75} = 55\% \cdot w \cdot Q1^{0.5}/\Delta hs1^{0.75} = 55\% \cdot ws1$.

Assuming that the specific speed ws1 of the first compression stage is equal to the optimum specific speed, the second stage operates at 55% of the optimum specific speed.

This does not allow the efficiency of the system to be optimized.

SUMMARY OF THE INVENTION

One aim of the present invention is to overcome some or all of the drawbacks of the prior art described above.

For this purpose, the device according to the invention, moreover complying with the general definition given in the above preamble, is essentially characterized in that the turbine of the expansion mechanism is coupled to the drive motor of the first compression stage.

That is, the device may be a refrigerator with a reverse Brayton cycle using a centrifugal compressor with two stages mounted in series and two motors, preferably electric, for driving the compressors. The low-pressure stage (first compressor) and the expansion turbine are mounted on the rotor of one and the same motor (first motor) and the high-pressure stage is mounted on the rotor of the second motor.

Furthermore, embodiments of the invention may comprise one or more of the following features:
- the electric drive motor of the first compression stage comprises an output shaft, one end of which carries the first compression stage and causes it to rotate by direct coupling and the other end of which is caused to rotate by the turbine by direct coupling,
- the two motors are identical or similar,
- the cooling mechanism comprises an intermediate cooling exchanger located between the first compression stage and the second compression stage, for cooling the fluid leaving the first compression stage before it enters the second compression stage,
- the motors are high-speed motors, i.e. motors for which the product of the power P in kW times the speed N in revolutions per minute squared (P·N$^2$) is between $5 \cdot 10^{10}$ and $5 \cdot 10^{12}$
- the rotary speed of the two motors is identical,
- the mechanical power of the two motors is identical,
- the drive motor of the second compression stage also mechanically drives a circulating pump or additional compressor configured for circulating a cooling fluid of the motor or motors,
- the two compression stages each consist of a centrifugal compressor possessing an optimum specific speed determined by maximizing the energy efficiency of the compressor, the device being configured to maintain the specific speed of the compressors between 70% and 130% and preferably between 80% and 120% of the optimum specific speed and even more preferably between 90% and 110% of the optimum specific speed,
- the two compression stages consist of centrifugal compressors each possessing an optimum specific speed determined by maximizing the energy efficiency of the compressor, each compressor possessing a defined volume flow rate and a defined mechanical power, the ratio of the volume flow rate of the first compressor to the volume flow rate of the second compressor being between 1.1 and 2.5 and preferably equal to 1.8 and the ratio of the mechanical power driving the first compressor to the mechanical power driving the second compressor being between 1.1 and 2.5 and preferably equal to 1.5 and the ratio of the rotary speeds of the two motors being between 0.5 and 1.5 and preferably equal to 1,
- the device comprises an electronic unit for controlling the device and comprises a unit for data storage and processing, the electronic control unit being configured notably for controlling at least one of the motors,
- the working circuit is preferably closed,
- the two motors are of the electric type,
- the motors possess the same electromagnetic stators and/or the same electromagnetic rotors and/or the same bearings and/or the same cooling systems,
- the cooling mechanism comprises at least one cooling exchanger located between the second compression stage and the turbine, for cooling the fluid leaving the second compression stage before it enters the turbine,
- at least one of the cooling exchangers is a countercurrent exchanger also providing heat exchange with the working fluid after it leaves the turbine and/or after heat exchange with the component to be cooled
- the drive motor of the second compression stage comprises an output shaft that carries the second compression stage and causes its rotation by direct coupling,
- the expansion turbine or turbines are of the type with centripetal expansion,
- the output shafts of the motors are mounted on bearings of the magnetic type or of the gas dynamic type, said bearings being used for supporting the compressors and turbine respectively,
- the heating mechanism comprises a common heat exchanger through which the working fluid passes in countercurrent depending on whether it is cooled or heated,
- the working circuit comprises a reservoir forming a buffer tank for storage of the working fluid,
- the working fluid is in the gas phase and consists of a pure gas or a mixture of pure gases from: helium, neon, nitrogen, oxygen, argon, carbon monoxide, methane, or any other suitable fluid,
- the working fluid is submitted in the circuit to a thermodynamic working cycle (temperature T, entropy S) of the reverse Ericsson type.

The invention also relates to a method of refrigeration of a cold source using a refrigerating device according to any one of the characteristics given above or hereunder, in which heat exchange takes place between the working fluid cooled after it leaves the expansion mechanism and the component to be cooled.

According to other possible particular features:
- the specific speed of the compressors is maintained between 70% and 130% and preferably between 80% and 120% and even more preferably between 90% and 110% of their optimum specific speeds.

The invention may also relate to any alternative device or method comprising any combination of the features presented above or hereunder.

BRIEF DESCRIPTION OF THE FIGURES

Other particular features and advantages will become clearer on reading the following description, referring to the figures, in which.

DETAILED DESCRIPTION OF THE INVENTION

Figure 3:
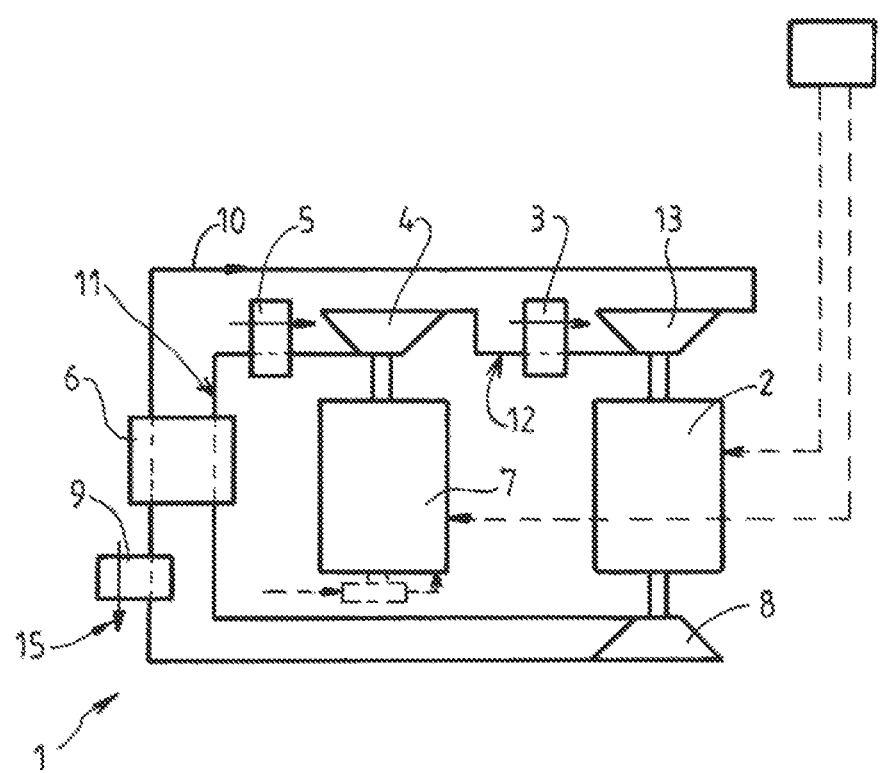
FIG. 3 shows a schematic partial view illustrating the construction and operation of a refrigerating device according to a possible embodiment example of the invention.

The low-temperature refrigerating device (between −100° C. and −273° C. and for example cryogenic) shown in FIG. 3 comprises a closed working circuit 10 containing a working fluid submitted to a thermodynamic cycle during which the fluid reaches a cryogenic temperature. The cooled working fluid undergoes heat exchange with a component or fluid 15 to extract heat from it (for example directly or via a heat exchanger 9).

The working circuit 10 comprises, arranged in series: a mechanism for compression of the fluid 13, 4 (preferably isentropic or substantially isentropic), a mechanism for cooling the fluid 3, 5, 6 (preferably isobaric or substantially isobaric), a mechanism 8 for expansion of the fluid (preferably isentropic or substantially isentropic) and a mechanism 9, 6 for heating the fluid (preferably isobaric or substantially isobaric).

The compression mechanism is of the type with centrifugal compression, i.e. it uses (preferably exclusively) compressors of the centrifugal type.

The compression mechanism preferably consists of two compression stages 13, 4 (i.e. two compressors) respectively a first compression stage 13 and a second compression stage 4 arranged in series in the circuit 10. That is, the device comprises, for the compression, only two compressors, that is two wheels which compress the working fluid.

The device 1 comprises two motors 2, 7, preferably electric, for driving the two compression stages 13, 4 respectively.

The expansion mechanism comprises (or consists of) a turbine 8 (preferably of the centripetal type) driving the motor 2 (coupled to the motor) of one, 13, of the compression stages. More precisely the turbine 8 of the expansion mechanism helps the motor 2 to drive the first compression stage (i.e. the drive motor 2 of the first compressor 13 of the two compressors in series). That is, the compressor uses and comprises only one expansion turbine.

Thus, the device uses two motors 2, 7 and the second motor drives, only at one of its ends, a second centrifugal compressor 4. This second compressor 4 is located downstream of the first compressor 13 (downstream refers to the direction of circulation of the working fluid in the circuit 10).

This novel architecture makes it possible to distribute the overall increase in enthalpy $\Delta hs$ over the two compression stages and consequently makes it possible to reduce the increase in enthalpy $\Delta hs$ of one stage and increase the specific speed of the compression stages to get closer to the optimum specific speed for each compressor.

Figure 1:
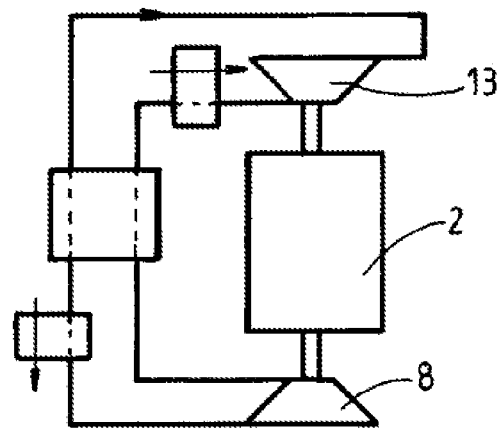
FIG. 1 shows a schematic partial view illustrating the construction and operation of a refrigerating device according to a first embodiment example from the prior art.
Figure 2:
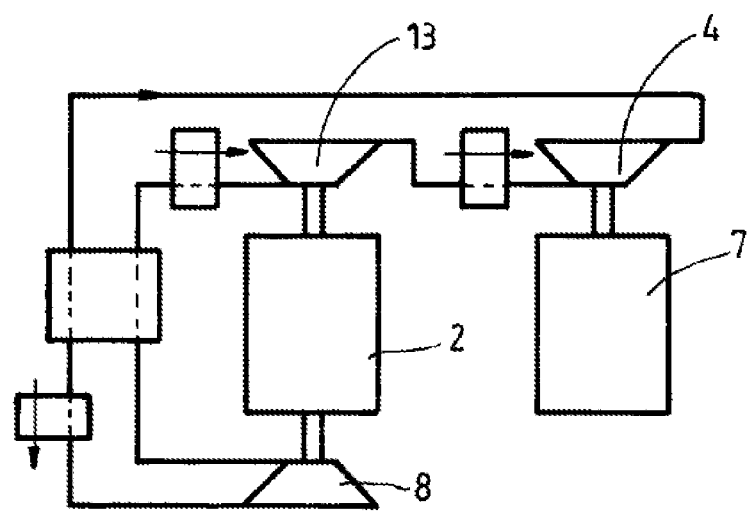
FIG. 2 shows a schematic partial view illustrating the construction and operation of a refrigerating device according to a second embodiment example from the prior art.

The overall increase in enthalpy $\Delta hs$ is not altered relative to the prior art in FIG. 2.

This overall increase in enthalpy $\Delta hs$ is distributed between the two compression stages 13, 4, again making it possible to increase the specific speed of the compression stages and approach or reach the optimum specific speed.

Owing to this novel architecture, the two compression stages 13, 4 can operate close to or at the optimum specific speed (and not only the first stage as was the case in the prior art).

This can be illustrated in the following example of calculation, where it is assumed that the mechanical power and the rotary speed w of the two motors 2, 7 are identical.

In this example, the mechanical power P1 of the first compression stage is equal to 150% of the mechanical power P2 of the second compression stage due to the presence of the turbine 8 which typically helps the first motor 2 to raise its power by 50%.

Since the mechanical power P is equal to the product of the mass flow rate m times the increase in enthalpy $\Delta h$ ($P=\dot{m}\cdot\Delta h$), and the mass flow rate of the two compression stages is identical, the increase in enthalpy $\Delta h1$ of the first compression stage is equal to 150% of the increase in enthalpy of the second compression stage $\Delta h2$, i.e. $\Delta h1=150\% \Delta h2$:

If, moreover, it is assumed that the efficiencies of the two compression stages are identical then $\Delta hs1=150\% \Delta hs2$.

The volume flow rate Q1 of the first compression stage 13 is equal to 180% of the volume flow rate Q2 of the second compression stage because the compression ratio is typically 1.8 at the level of the first compression stage. That is: $Q1=180\% Q2$.

The specific speed ws1 of the first compression stage is given by $ws1=w\cdot Q1^{0.5}/\Delta hs1^{0.75}=w\cdot(180\% \ Q2)^{0.5}/(150\% \ \Delta hs2)^{0.75}=99\%\cdot w\cdot Q2^{0.5}/\Delta hs2^{0.75}=99\%\cdot ws2$.

Assuming that the specific speed ws2 of the second compression stage is equal to the optimum specific speed, the first stage operates at 99% of the optimum specific speed.

That is, the specific speeds ws1, ws2 of the first and second compressor 13, 4 (which are identical) are equal to 99% to 100% of the optimum specific speed.

Thus, the architecture according to the invention makes it possible to operate the device in such a way that the two compression stages 13, 4 operate at the optimum specific speed.

In the example given above the two motors 2, 7 are identical, the speeds w of the two motors 2, 7 are identical and the specific speeds ws of the two compressors 13, 4 are identical and optimum.

Of course, the two compression stages 13, 4 may be controlled to different speeds to operate close to or at the optimum specific speed also in the case when the mechanical power and/or the rotary speed of the two motors are different.

The energy efficiency of the refrigerating device is thus improved relative to the prior art.

The refrigerating device 1 illustrated in FIG. 3 mainly consists of a first compression stage 13 (rotary compressor) whose rotor is driven by the first high-speed motor 2. High-speed motor means a motor for which the product of the power P in kW times the speed N in revolutions per minute squared ($P\cdot N^2$) is greater than $5.10^{10}$ (for example between $5.10^{10}$ and $5.10^{12}$). This first high-speed motor 2 also receives, at the other end of its rotating shaft, the expander 8 (expansion turbine, preferably centripetal) which helps motor 2 to drive the first compression stage 13. The device comprises a second compression stage 4 whose rotor is driven by the second high-speed motor 7.

The first compression stage 13 compresses the working fluid (a gas or a gas mixture) starting from a low pressure (typically a gas at a pressure of 5 bar abs and a temperature of 15° C.). The first compression stage 13 transfers the compressed gas via a pipe 12 of the circuit 10 (for example at a pressure of 9 bar abs and a temperature of 77° C.). Preferably a cooling exchanger 3 ("intercooler") for removing all or part of the heat of compression (typically to 15° C. for example) can be mounted on this "medium-pressure" pipe 12. The cooling exchanger 3 provides for example direct or indirect heat exchange with a heat-transfer fluid.

That is, downstream of this cooling exchanger 3, compression of the working gas may be described as isothermal.

The second compression stage 4 then compresses the working fluid starting from medium pressure (typically 9 bar abs and 15° C.) and transfers it, via a pipe 11 (typically at a pressure of 13.5 bar abs and a temperature of 56° C.). This so-called "high-pressure" pipe 11 preferably comprises a heat exchanger 5 ("intercooler") for removing all or part of the heat of the second compression (cooling typically to 15° C. for example). The cooling exchanger 5 provides for example direct or indirect heat exchange with a heat-transfer fluid. That is, downstream of this cooling exchanger 5, compression of the working gas may be described as isothermal.

The working fluid is then cooled in an exchanger 6 (for example typically to −145° C.). This exchanger 6 may be a countercurrent exchanger, providing heat exchange between the relatively hot working gas at the end of compression and the relatively cold working gas after expansion and heat exchange with the component 15 to be cooled.

The working fluid is then admitted into the expansion stage (turbine 8), which expands the working fluid starting from high pressure (typically 13.5 bar abs and a temperature of −145° C.) to a low pressure (typically 5 bar abs and a temperature of −175° C.). The expanded working fluid is then transferred via a pipe into a heat exchanger 9 used for extracting heat from the fluid, for example to cool an object or fluid 15. The temperature of the fluid rises in this exchanger 9 (for example typically to −145° C.).

The working fluid may then be heated in the aforementioned countercurrent heat exchanger 6 (for example typically to 15° C.).

The compression ratios of the two compression stages 13, 4 may be selected so that the specific speed ws of the two compression stages is as close as possible to the optimum value.

The compression ratios of the compressors 13, 4 may preferably be selected so that the motors 2 and 7 are identical. That is, for example, the stator and/or the rotor and/or the bearings of the motors are identical.

Thus, "identical or similar motor" denotes motors that are strictly identical or are different but have similar or identical technical characteristics (work supplied, etc.), notably their maximum torques are equal or approximately equal. For example, the work-generating mechanisms of the motors are identical or have performance that is identical or close to 130%.

This standardization of the motors 2, 7 also offers advantages in terms of maintenance (smaller number of different components, lower cost of production owing to the scale effect).

Although of simple and inexpensive construction, the invention makes it possible to improve the efficiency of refrigerating devices.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A device for low-temperature refrigeration between −100° C. and −273° C. comprising a working circuit containing a working fluid, the device being capable of extract heat from at least one component by heat exchange with the working fluid circulating in the working circuit, the working circuit comprising in series:
    first and second centrifugal compressors arranged in series for isentropic or substantially isentropic compression of the fluid;
    first and second electric drive motors for correspondingly driving the first and second centrifugal compressors, the first electric drive motor and the first centrifugal compressor forming a first compression stage, the second electric drive motor and the second centrifugal compressor forming a second compression stage;
    a cooling exchanger for isobaric or substantially isobaric cooling of the fluid;
    a turbine coupled to the motor of the first compressor for isentropic or substantially isentropic expansion of the fluid, wherein:
        each of the centrifugal compressors has an optimum specific speed that is determined by maximizing its energy efficiency;
        the first centrifugal compressor has a defined volume flow rate (Q1) and a defined mechanical power (P1);
        the second centrifugal compressor has a defined volume flow rate (Q2) and a defined mechanical power (P2);
        the first electric drive motor has a rotary speed w1 in radians per second;
        the second electric drive motor has a rotary speed w2 in radians per second;
        a ratio Q1:Q2 is between 1.1 and 2.5;
        a ratio P1:P2 is between 1.1 and 2.5; and
        a ratio w1:w2 is between 0.5 and 1.5.

2. The device of claim 1, wherein the first electric drive motor comprises an output shaft, one end of which carries the first compression stage and causes it to rotate by direct coupling and the other end of which carries and is caused to rotate by the turbine by direct coupling.

3. The device of claim 1, wherein the first electric drive motors are identical.

4. The device of claim 1, wherein the cooling exchanger is located between the first compression stage and the second compression stage, for cooling the fluid leaving the first compression stage before it enters the second compression stage.

5. The device of claim 1, wherein each of the first and second electric drive motors a power P in kW and a speed N in revolutions per minute, wherein $P \cdot N^2$ is between $5.10^{10}$ and $5.10^{12}$.

6. The device of claim 1, wherein a rotary speed of the first and second drive motors is identical.

7. The device of claim 1, wherein the first and second electric drive motors have a same mechanical power.

8. The device of claim 1, wherein the drive motor of the second compression stage also mechanically drives either a circulating pump or an additional compressor configured for circulating a cooling fluid for the electric drive motors.

9. The device of claim 1, wherein each of the centrifugal compressors has an optimum specific speed that is determined by maximizing its energy efficiency and said device is configured to maintain a specific speed of the centrifugal compressors between 70% and 130% of the optimum specific speed.

10. The device of claim 1, wherein:
Q1 is the volume flow rate at an inlet of the first centrifugal compressor in m3/s,
Q2 is the volume flow rate at an inlet of the second centrifugal compressor in m3/s,
$\Delta hs1$ is the increase in enthalpy through the first compression stage (in J/kg) assuming the compression to be isentropic,
$\Delta hs2$ is the increase in enthalpy through the second compression stage (in J/kg) assuming the compression to be isentropic; and
$(w1/w2) \cdot (Q1/Q2)^{0.5} \cdot (\Delta hs2/\Delta hs1)^{0.75}$ is between 0.70 and 1.30.

11. The device of claim 1, further comprising an electronic control unit comprising a data storage and processing unit, the electronic control unit being configured for controlling at least one of the first and second electric drive motors.

12. A method of refrigeration of a component of a cold source using the refrigerating device of claim 1, comprising the steps of:
cooling the working fluid with the refrigerating device of claim 1; and
allowing heat exchange to take place between the cooled working fluid and the component to be cooled after the cooled working fluid leaves the turbine.

13. The method of refrigeration of claim 12, wherein the specific speeds of the compressors is maintained between 70% and 130% of their optimum specific speeds.

* * * * *